US006633407B1

(12) United States Patent
Kim et al.

(10) Patent No.: US 6,633,407 B1
(45) Date of Patent: Oct. 14, 2003

(54) HMMD COLOR SPACE AND METHOD FOR QUANTIZING COLOR USING HMMD SPACE AND COLOR SPREADING

(75) Inventors: Hyeon Jun Kim, Kyungki-do (KR); Jin Soo Lee, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/239,773

(22) Filed: Jan. 29, 1999

(30) Foreign Application Priority Data

Apr. 29, 1998 (KR) ........................................ 1998-15326
May 28, 1998 (KR) ........................................ 1998-19401

(51) Int. Cl.[7] ................................................. G06K 9/00
(52) U.S. Cl. ..................... 358/1.9; 358/518; 358/520; 382/162; 382/167; 345/604
(58) Field of Search ................................. 358/1.9, 1.13, 358/500, 504, 515, 516, 518, 519, 520–523; 382/162, 164, 167, 168, 169, 172; 345/603, 604, 605

(56) References Cited

U.S. PATENT DOCUMENTS

| 5,237,517 A | * | 8/1993 | Harrington et al. | ......... 382/162 |
| 5,243,414 A | * | 9/1993 | Dalrymple et al. | .......... 358/500 |
| 5,534,915 A | | 7/1996 | Sandrew | ....................... 348/29 |
| 5,751,286 A | | 5/1998 | Barber et al. | ................ 345/348 |
| 5,754,316 A | * | 5/1998 | Hayashi et al. | .............. 358/518 |
| 6,163,622 A | * | 12/2000 | Abdel-Mottaleb et al. | .. 382/170 |
| 6,185,013 B1 | * | 2/2001 | Harrington et al. | ......... 358/520 |
| 6,310,969 B1 | * | 10/2001 | Kim et al. | ................... 382/162 |
| 6,326,974 B1 | * | 12/2001 | Satoh et al. | ................. 345/581 |

FOREIGN PATENT DOCUMENTS

| JP | 62092074 | 4/1987 |
| JP | 1314388 | 12/1989 |
| JP | 111016 | 4/1994 |
| JP | 7058968 | 3/1995 |
| JP | 8265585 | 10/1996 |

OTHER PUBLICATIONS

Foley, J.D. et al. "Fundamentals of Interactive Computer Graphics" 1982, pp 613–616.
Bach, Jeffrey R. et al. "The Virage Image Search Engine: An open framework for image management", Virage, Inc., San Diego, Ca.
Smith, John R., "Integrated Spatial and Feature Image Systems: Retrieval, Analysis and Compression", Columbia University, 1997. pp 15–17.
Iong–Wen Tsai et al., "Segmentation of Multispectral Remote–sensing Images based on Markov Random Fields," Geoscience and Reporte Sensing, 1997, IGRASS 97, Remote Sensing—A Scientific Vision for Sustainable Development, 1997 IEEE International Singapore Aug. 3–8, 1997, New York, NY, IEEE, Aug. 3, 1997.
Asha Vellaikal et al., "Content–Based Image Retrieval Using Multiresolution Histogram Representation," Proceedings of the SPIE, SPIE, Bellingham, WA vol. 2606, 1995.
European Search Report dated Oct. 30, 2002.

* cited by examiner

*Primary Examiner*—Edward Coles
*Assistant Examiner*—Joseph R. Pokrzywa
(74) *Attorney, Agent, or Firm*—Fleshner & Kim, LLP

(57) ABSTRACT

A new color model HMMD is disclosed based upon hue, the shade, the tone, the tint and the brightness of a color, and a color quantizing method using the HMMD color space. The present invention regards the colors adjacent to a given color in the color space as the neighboring colors to consider indices of the neighboring colors as the partial values according to the distance. Accordingly, the present invention can accomplish a color quantization close to the change of the color sensed by the human eye, thereby capable of enhancing a performance of the image searching system based on content.

15 Claims, 7 Drawing Sheets

——————— Line linking color points having identical d value
--------- Line linking color points having identical max value
─·─·─·─·─ Line linking color points having identical min value

HMMD COLOR SPACE AND METHOD FOR QUANTIZING COLOR USING HMMD SPACE AND COLOR SPREADING

BACKGROUND OF THE INVENTION

1. Field of the Invention

The present invention relates to a hue max min diff (HMMD) color model, and more particularly for quantizing colors using the HMMD space and color spreading. The present invention relates a content based image searching by building a color histogram.

2. Discussion of Related Art

Currently, extensive research for searching an image based upon the contents is actively being conducted. In response, commercial image searching apparatus and/or applications program are being developed to meet the demand for an improved content based image searching. For example, using contents such as a color temperature change, an external cross magnetic field, and a color homogeneity have been proposed for searching a human image. For color homogeneity, a color space must first be quantized or expressed as numerical values.

The most important information for use in the content based image searching is the color information. Accordingly, an effective performance of an image searching apparatus or applications program depends greatly on an accurate method for extracting the color information.

Generally, the number of different colors which can theoretically be expressed by a computer has been steadily increasing. However, the number of colors which can be displayed by the computer is limited by the available number of quantized colors. A problem arises because the number of quantized colors is less than the number of the colors which can be expressed. Quantization is a procedure of color mapping from M number of colors to N number of colors when M>>N, where M and N are positive integral numbers.

In computers, a color is expressed utilizing the RGB color model based upon the three primary colors of red R, green G, and blue B. However, the RGB space is hardware oriented and a limitation exists in expressing the color changes such that the change can be sensed by the human eye. Thus, the RGB space is often converted into a user oriented HSV color model based upon a hue H, saturation S and value V, then converted back to the RGB space by quantization.

Content based image searching apparatuses or applications programs utilizing the HSV space have been proposed by Foley and Dam in "Fundamental of Interactive Computer Graphics", Addison Wesley, pp. 613–16, 1984; Smith in "Integrated Spatial and Feature Image Systems: Retrieval, Analysis and Compression", Ph.D. thesis, Columbia University 1997; Virage searching engine, web cite: www.virago.com; and U.S. Pat. No. 5,751,286.

However, even within the HSV space, a range of color changes which can be sensed by the human eye are differently displayed. Also, a simple quantization of the colors in the HSV space does not result in a uniform expression of colors. On the other hand, to quantize the saturation vector value in consideration of the color change sensed by the human eye, the selection of a quantization model would be difficult and many complicated calculations are required. Thus, the performance of the content based image searching system using the HSV space deteriorates.

Accordingly, a color space and a color quantization method utilizing a color space capable of performing color quantization in consideration of the color changes sensed by the human eye and capable of uniformly dividing the colors are required.

SUMMARY OF THE INVENTION

Accordingly, an object of the present invention is to solve at least the problems and disadvantages of the related art.

An object of the present invention is to provide a new color model HMMD based upon the hue, the shade (max), the tint (min), the tone (diff), and the brightness (sum).

Another object of the present invention is to provide a method for quantizing a color using the HMMD space and color spreading.

A further object of the present invention is to provide a method for quantizing a color in consideration of the color changes sensed by the human eye.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the HMMD color space according to the present invention includes the hue, max, min, diff and sum. The method for quantizing a color using the HMMD color space and color spreading according to the present invention determines a distance between a color to be mapped and the neighboring colors and maps the color utilizing the determined distance as weights.

BRIEF DESCRIPTION OF THE ATTACHED DRAWINGS

The invention will be described in detail with reference to the following drawings in which like reference numerals refer to like elements wherein.

DETAILED DESCRIPTION OF PREFERRED EMBODIMENT

Reference will now be made in detail to the preferred embodiments of the present invention, examples of which are illustrated in the accompanying drawings.

Figure 1:
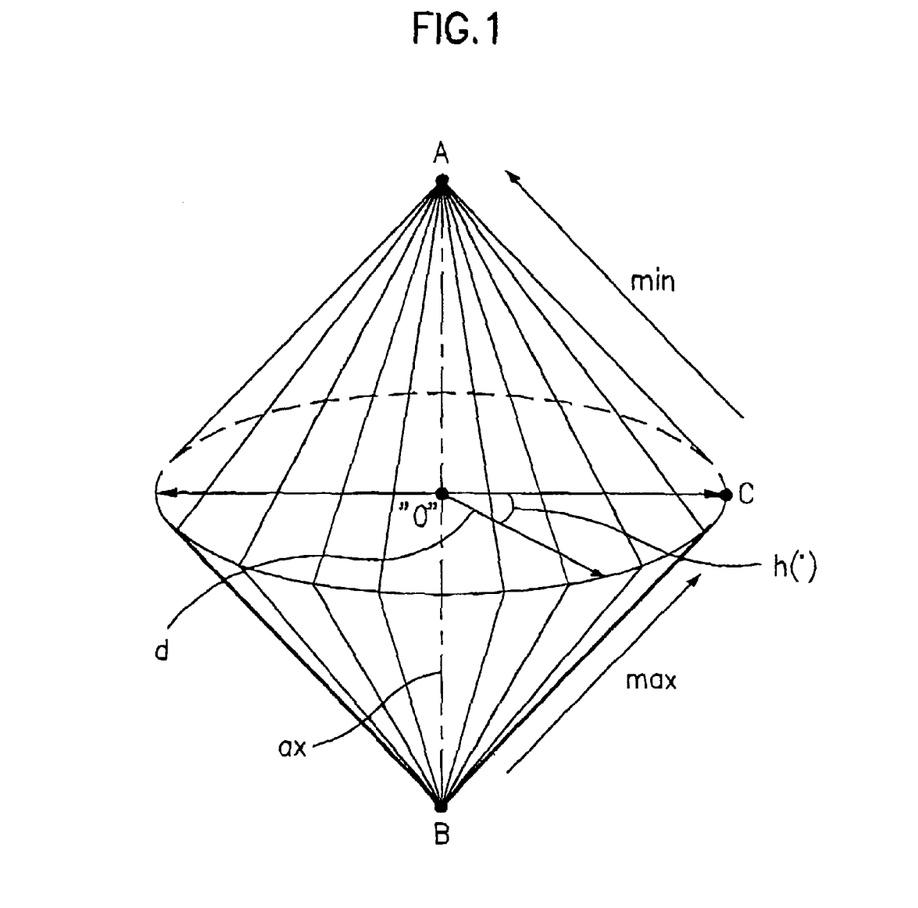
FIG. 1 shows a HMMD color space according to the present invention.

The HMMD color model according to the present invention is generally defined by the hue, the shade (max), the tint (min), the tone (diff), and the brightness (sum). These four factors are the three dimensional coordinate axis for the color space. FIG. 1 shows the HMMD model having the shape of two symmetrical cones being merged at the flat surfaces, Particularly, the three dimensional color space is formed by the hue h° having an angle θ of 0°–360° around the AB axis; the tone diff being a normal vector of ax in the direction from the center point O to the maximum circumference C; the shade max being a vector in the direction from the apex B to the maximum circumference C; and the tint min being a vector in the direction from the maximum circumference C to the apex A.

The cross sectional plane of the cone taken perpendicular to the center line ax is a 2-dimensional plane having a circular shape, where the values diff and h may change depending on the cross sectional plane. The diff would be a vector from the center O to the circumference of a 2-dimensional plane, and the hue would be the angle θ defined by two vectors on the 2-dimensional plane from the center O to the circumference of the 2-dimensional plane.

Figure 2:
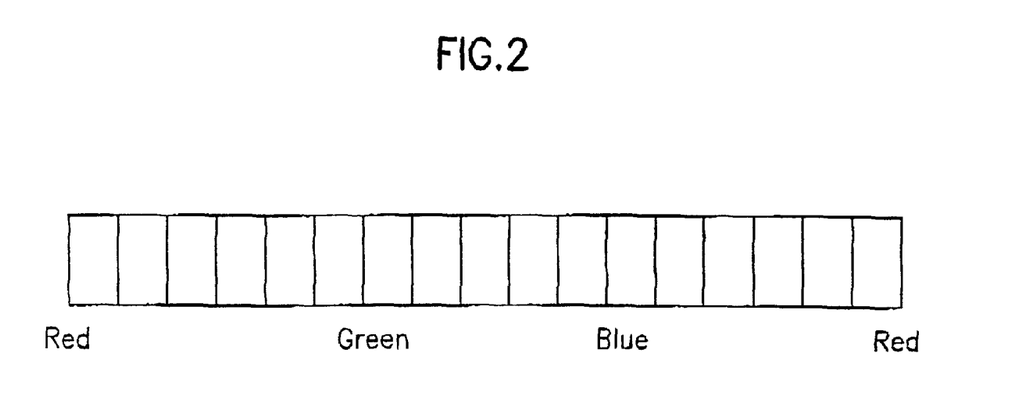
FIG. 2 shows a color area of the HMMD color space in FIG. 1.

When the circumference of the 2-dimensional color space with a maximized circumference, i.e. max=maximum{max}, min=0, diff=maximum{diff}, is spread, the change of the hue may be displayed as shown in FIG. 2. The change of the hue would be displayed by pure colors such as red, yellow, green, cyan, blue and purple. Also, if the spread color is equally divided, the color quantization of the color space is accomplished. A detailed explanation of the HMMD model will follow.

Figure 3:
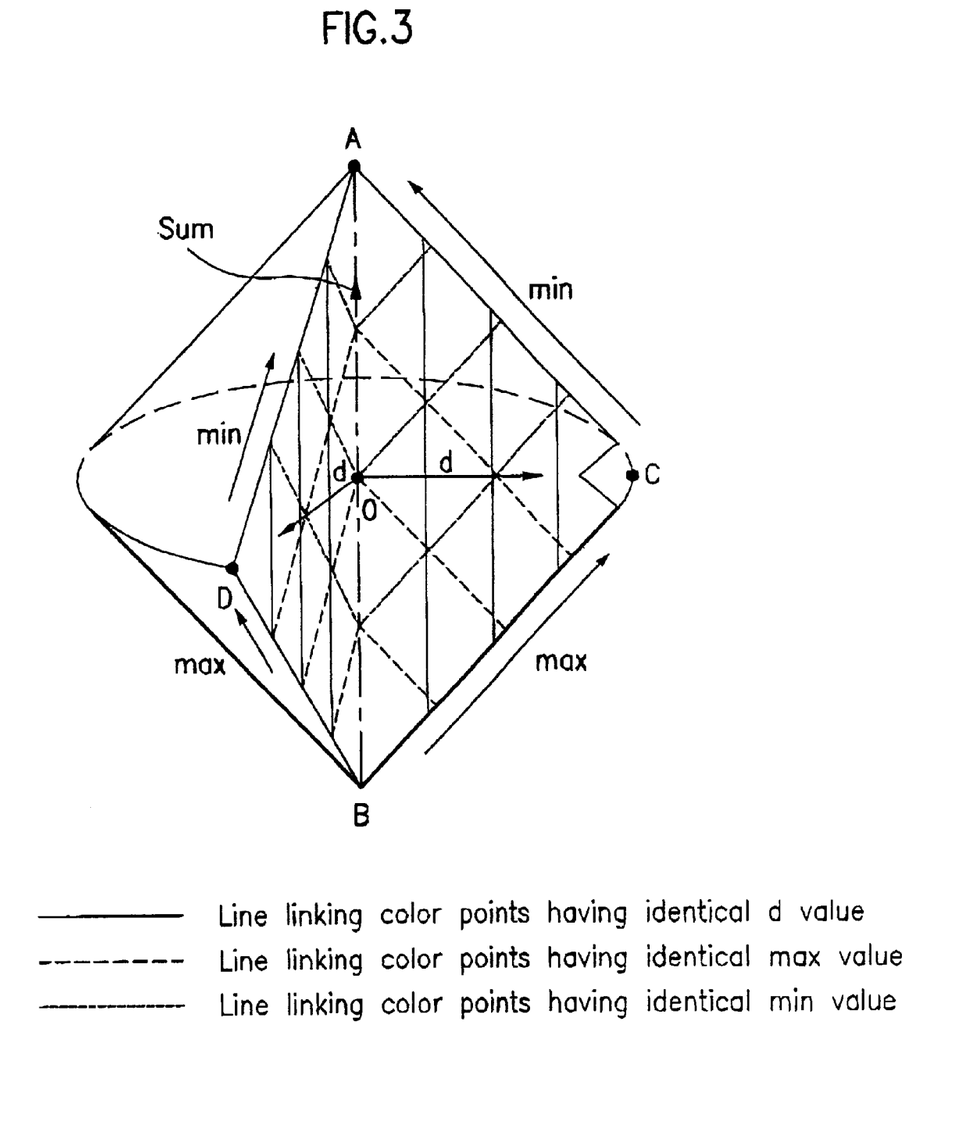
FIG. 3 shows a detail view of the HMMD color space in FIG. 1.

A normal plane passing through a sum vector and having a boundary defined by the two apex A and B, and a point C on the maximum circumference becomes an MMD plane which contains the sum, the max, the min and the diff as shown in FIG. 3. Note that the center line ax is the sum of the max and min vectors (sum). Moreover, the sum expresses the brightness of a color changing from black to white.

One MMD plane displays the max, the min, the diff, and the sum at a given hue $\theta_1°$, and may be represented by a 2-dimensional plane or a triangle connecting three angular points expressing black, white and pure color. Particularly, the max value controls the color shade and changing the max value changes the shade from black to white and/or pure color. The min value controls the tint and changing the min value changes the tint from black and pure color to white. The diff value controls the tone and changing the diff value changes the tone from gray to a pure color.

Figure 4:
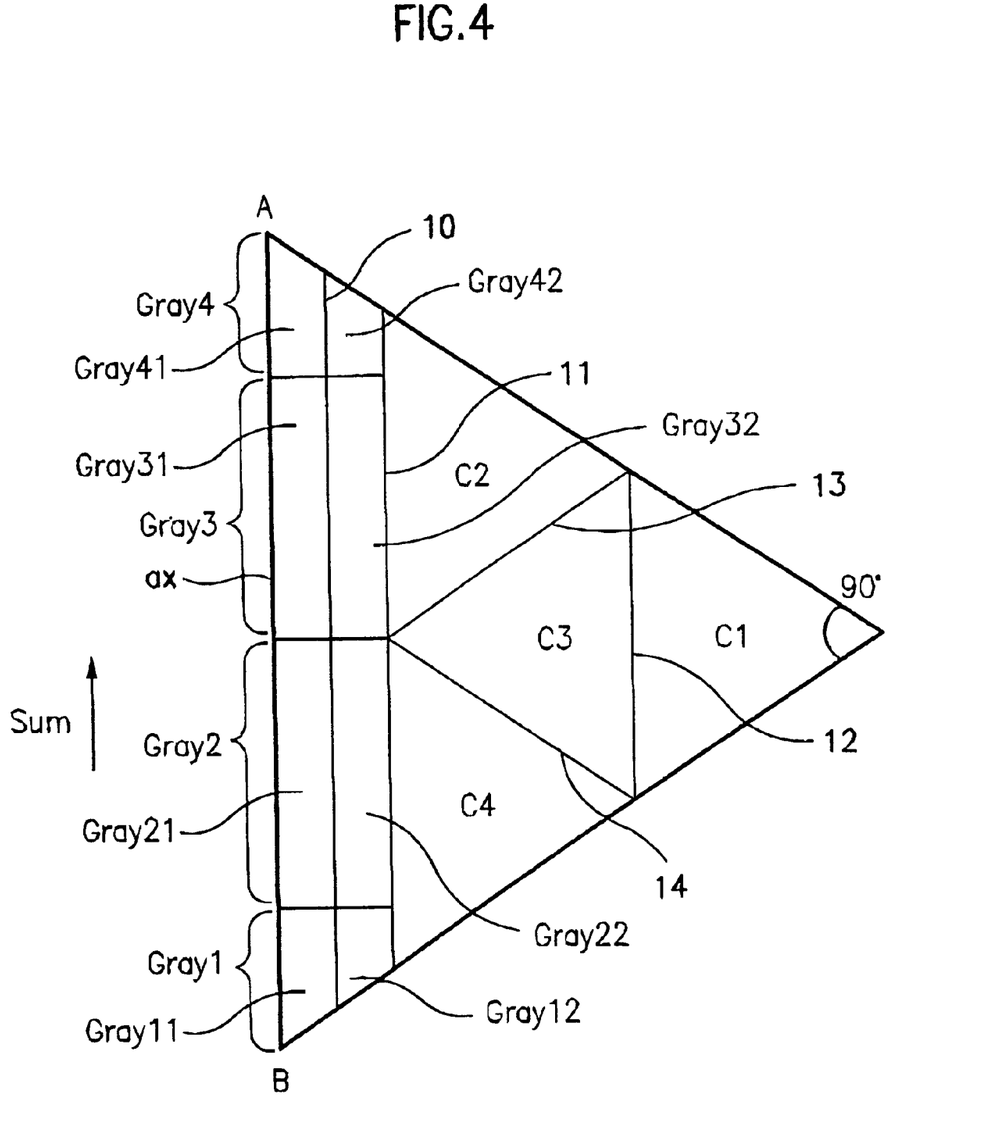
FIG. 4 is a first embodiment of the color coordinate plane according to the present invention.

Accordingly, utilizing a MMD plane of hue $\theta_1°$ as a color space, the color quantization can be performed by the color coordinate plane as shown in FIG. 4. Referring to FIG. 4, the MMD space is divided by lines 11 and 12 parallel to the center line ax, by a line 13 parallel to the max vector, and by a line 14 parallel to the min vector. The color quantization is achieved by mapping the color information within each divided areas (C1–C4) to an identical value. Using the HMMD color space, color quantization can be performed uniformly by mapping the color information within the equally (or nonequally) divided areas in the color coordinate plane.

Figure 5:
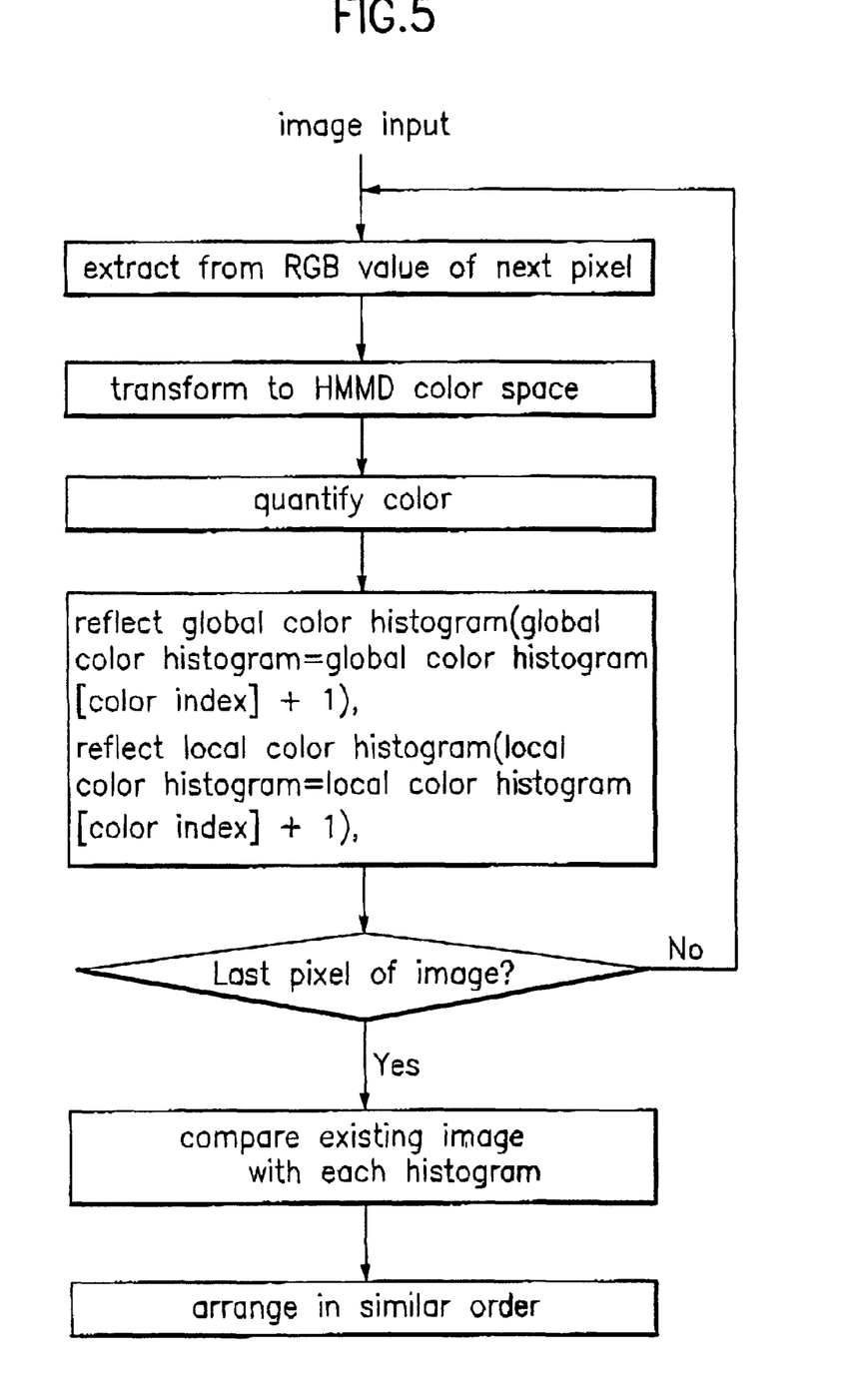
FIG. 5 is a flow chart of a content based image searching according to the present invention.

Therefore, a conversion from RGB space to the HMMD space is first performed for a user oriented model, and subsequently a quantization is performed in the HMMD color space to convert back to the RGB space for the computer. FIG. 5 shows a flow chart performing the RGB space conversion, the color quantization, and an image searching therefrom.

First, the RGB space is converted to the HMMD color space through the conversation procedure as follows; where the values max, min, diff and sum range from 0 to 1, and the value h ranges from 0 to 360. Also, if max=min, h is undefined for achromatic color.

$$\max = \text{MAXIMUM}\{r, g, b\}$$

$$\min = \text{MINIMUM}\{r, g, b\}$$

$$\text{diff} = \max - \min$$

$$\text{sum} = (\max + \min)/2$$

$$h = (g - b)/(\max - \min) * 60, \text{ if } (r = \max \cap (g - b) \geq 0)$$

$$= (g - b)/(\max - \min) * 60 + 360, \text{ if } (r = \max \cap (g - b) < 0).$$

$$= (2.0 + (b - r)/(\max - \min) * 60, \text{ if } (g = \max)$$

$$= (4.0 + (r - g)/(\max - \min) * 60, \text{ if } (b = \max)$$

The color quantization is accomplished through three procedures, namely the division of the gray area, the color quantization in the MMD space and the color quantization in the hue area.

In the division of the gray area, the diff value is compared to a predetermined reference value $\tau_{gray}$. If the diff is equal to or less than the reference value $\tau_{gray}$ (d≦$\tau_{gray}$), the area is determined as the gray area. The reference value $\tau_{gray}$ may changes depending upon the hue.

Theoretically, if dff=0, i.e. the AB axis, the gray color is displayed. Depending upon the relation of the diff value and the reference value, a given color area is determined as a gray area, shown by reference 11 in FIG. 4. Furthermore, depending on the sum and diff values, the gray area is divided into several gray levels (Gray1–Grayn) or (Gray11–Grayn).

The color quantization in the MMD space is accomplished in the area except for the area determined as the gray area. The max, min and diff values are the reference values of the quantization. As shown in FIG. 4, one MMD area is divided into plural areas (C1–C4) by the reference values 11, 12, 13 and 14. The divided areas are right isosceles triangles, and may be further divided into smaller triangles (C1–Cn) by an identical width based upon the max, min and diff values. As the MMD area is divided into smaller triangles, a more accurate mapping may be achieved.

FIG. 4 illustrates a case where the MMD area is divided into four levels (C1–C4) and where the gray area is divided into Gray 1–Gray 4 (or Gray 11–Gray 42) in the gray areas in the MMD plane. The following is an explanation for the color quantization in the hue area.

As shown in FIG. 2, the hue area is a continuous one dimensional apace in the order of red, green, blue and red. Defined as the angle around the AB axis, the hue area in the HMMD space according to the present invention has the same meaning as the hue in the existing HSV space. The hue area may be equally divided into identical segments. Alternatively, the hue area may be unequally divided giving the larger segments to the areas in which the RGB dominate.

Particularly, in order to use the existing quantization method, the hue value h according to the present invention may be transformed to h* to be more uniform with respect to the human eyses. A transformation from h to h* may be performed as follows for h ranging from 0 to 360.

$$h^* = 60 \times (1 - \cos(3/2 \times Rem)) + (quo) \times 120, \text{ where}$$
$$Rem = (int(h) \bmod 120) + (h - \lfloor h \rfloor) \text{ and}$$
$$quo = h/120$$

Once the RGB to HMMD conversion and the color quantization are complete as discussed above, the image searching can be performed as shown in FIG. 5. Generally, the RGB colors are divided into four gray areas and four color areas as shown in FIG. 4, and into twelve hue areas, resulting in fifty two ((4 color areas×12 hue areas)+4 gray areas) quantized colors.

The characteristic elements used in the image searching system are a global color histogram expressed by the fifty two quantized colors and a local color histogram. The global color histogram is the distribution of the color in each pixel of the entire image and expresses a color distribution of the entire input image. The local color histogram is the distribution of the color in a portion of the image and expresses the color distribution displayed in a particular portion of the image.

The RGB color values for each pixel of input images are extracted, converted into the HMMD space, and mapped by one of the fifty two colors in the HMMD space. The global color histogram and local color histogram are built for the pixels of each image according to the mapped color values. Subsequently, the histograms of the input images is compared to a reference histogram of the target image. The images are arranged by the order beginning from the image with a histogram of the highest similarity, thereby a search of the most similar image to the target image is complete.

Figure 6:
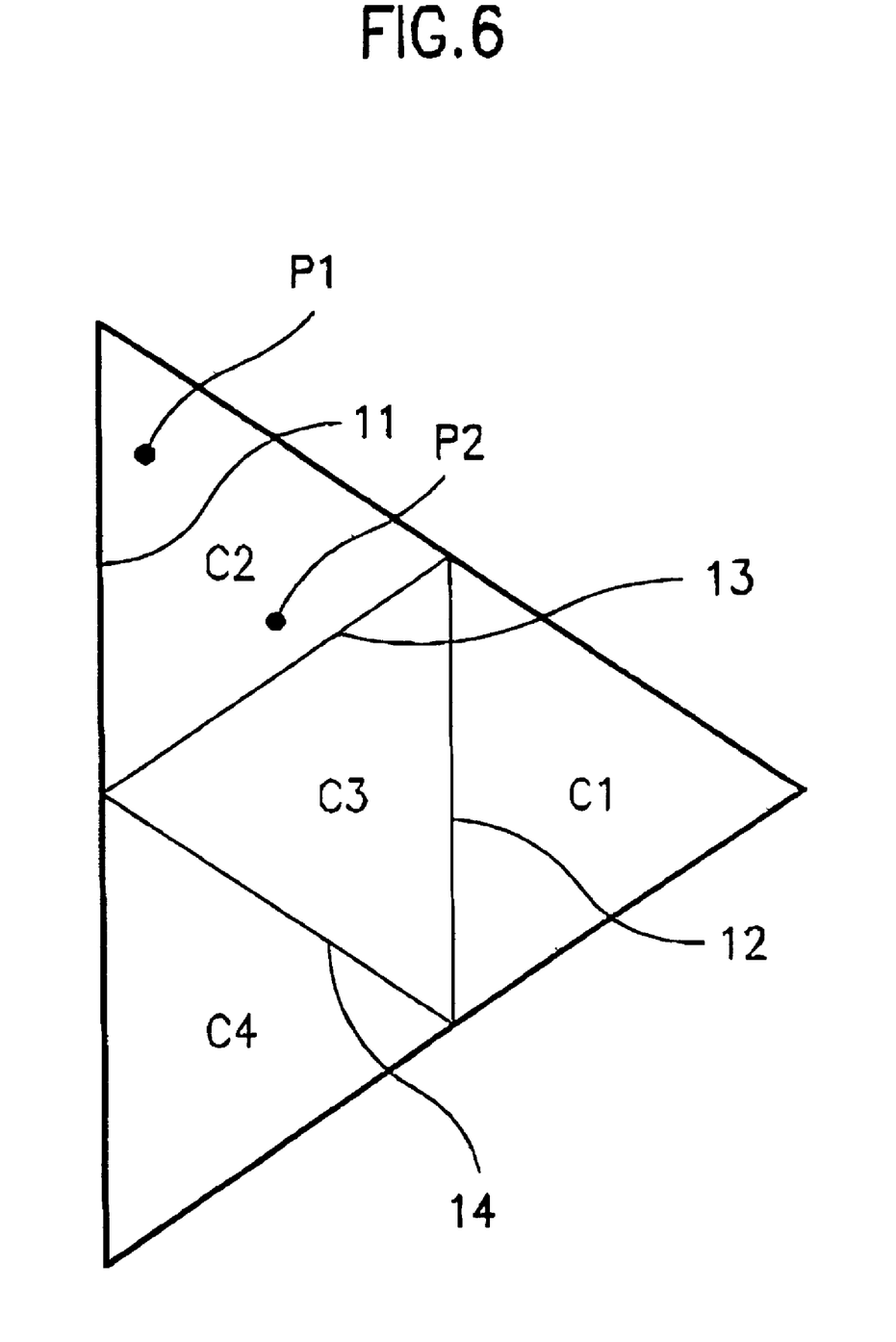
FIG. 6 shows an example color coordinate plane for an explanation of the present invention.

Although the HMMD space and color spreading as discussed above allows a uniform quantization, the quantization method may be improved. For example, in FIG. 6, the color of position P1 is mapped by C2 and the color of position P2 is also mapped by C2. However, because the position P2 is near C3, the color sensed by the human may be closer to C3 rather than C2. Nonetheless, the color quantizing method divides the color into n number of groups on the color space to simply map one group to one color.

Therefore, colors near the boundaries of the color group may be mapped to different colors in spite of being similar colors, thereby affecting the performance or reliability of the content based image searching system. Particularly, two colors closely positioned and thus similarly sensed by the human eye may be mapped to very different colors. As a result, a substantially similar image may be regarded as a different image.

Accordingly, the present invention proposes a color quantization method resulting in a color quantization which better reflects the changes sensed by the human eye by considering the neighboring colors on the color space in the color quantization. The indices of the neighboring colors are given weights according to the distance between a color to be mapped and the boundary lines of the neighboring colors.

Figures 7A, 7B:
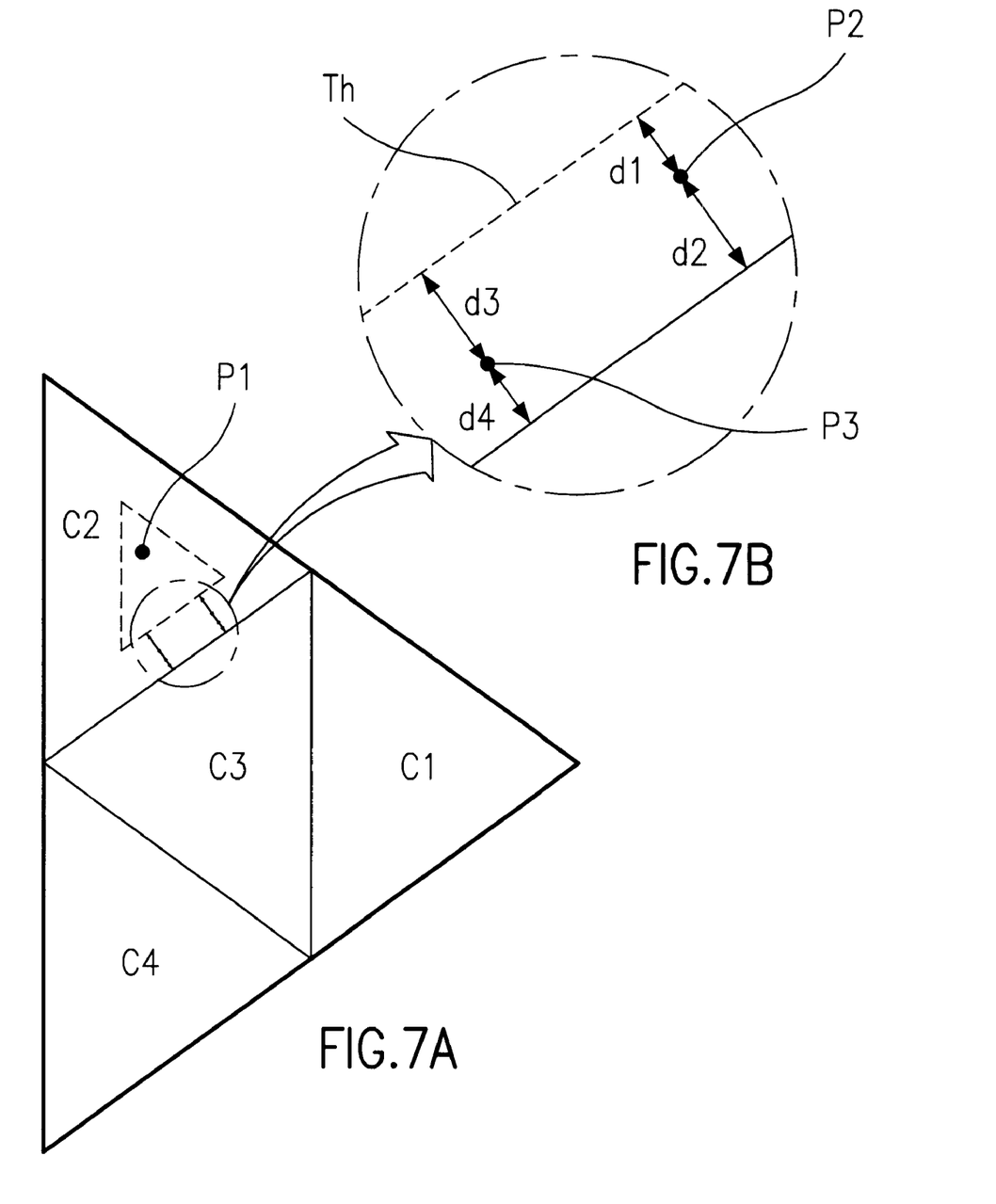
FIGS. 7A and 7B illustrate a first embodiment of a color quantizing method using color spreading according to the present invention.

FIGS. 7A and 7B illustrate a color quantizing method using color spreading according to the present invention. In the quantization method, the color of a position Px within the color group C2 is mapped by either C2 or by the adjacent color group C3 depending upon a threshold value Th. Particularly, the color of position P1 below the threshold Th is mapped by C2.

However, for the color of position P2 over Th, a weighted value is allotted in consideration of a distance d1 measured from P2 to Th and a distance d2 measured from P2 to the boundary line of the adjacent color group C3. Similarly, for the color of position P3 also over Th, a weighted value different from the weighted value of P2 is allotted in consideration of a distance d3 measured from P3 to Th and a distance d4 measured from P3 to the boundary line of the adjacent color group C3.

Moreover, the weighted value allotted is proportional to the distance to Th. For P2, the value of the d2 is lager than that d1, and for P3, the value of d4 is smaller than d3. Thus, P3 is closer to the boundary line than P2. Accordingly, the neighboring colors in C3 is given less weight for P2 than for P3.

The color quantizing method using the color spreading as discussed above performs the color quantization by adding the value of the neighboring colors=[{Th−distance to neighboring color}/Th]·{1/(number of neighboring colors+1)}], where the number of neighboring colors is the number of the neighboring colors satisfying the condition (Th−distance to neighboring color is larger than zero), and the value of the self color=(1−value of n neighboring colors).

The value of the neighboring color is a value obtained by dividing a given weighted value by a partial value of the neighboring color groups, and the value of the self color is a rest value obtained by dividing the given weighted value by partial values of the neighboring color groups. For example, for P1, the distance from P1 to the neighboring color is larger than the value of d1+d2 and P1 does not satisfy the condition (Th−distance to neighboring colors>0). Accordingly, P1 is mapped by C2.

That is, assuming Th is ten, the d1 is three and d2 is seven for P1, the weighted value of C1 is one. For P2, the color group adjacent C2 including P2 is only C3. Accordingly, the number of the neighboring color becomes one and the values for P2 are obtained as follows.

the value of the neighboring color C3=(10−7)/10·1/(1+1)=3/20), and the value of the self color C2=1−3/20=17/20.

Therefor, a weighted value of 17/20 is allotted to the C2 and 3/20 is allotted to C3.

As for P3, assuming that Th is ten, d3 is eight and the d4 is two, the color group adjacent C2 including P3 is also only C3, and accordingly the number of the neighboring color becomes one. Similarly, the values for P3 are obtained as follow.

the value of the neighboring color C3=(10−2)/10·1/(1+1)=2/5), and the value of the self color C2=1−2/5=3/5.

Therefor, a weighed value 3/5 is allotted to the C2 and 2/5 is allotted to the C3. Note that if the positions Px on the color space as shown in FIG. 7 were included in C3, the number of the neighboring colors would be three (C1, C2 and C4) and respective weighted values would be allotted to C1, C2 and C4.

Upon calculation of the weight values, a color quantization can be accomplished reflecting the real colors sensed by the human eye by giving the partial (weight) value to the neighboring color group in proportion to the distance to the neighboring color group using the color spreading. Moreover, the quantization method may be applied to a HSV color space or any other color space and is not limited to the HMMD color space.

Also, in the color quantizaton using the color spreading according to the present invention, the weights to the indices of neighboring color groups may be allocated by different methods. Rather than utilizing the threshold value Th, weights may be assigned based upon the concentric points of the quantized color groups. Namely, the neighboring color groups are given weights according to the distance between a color to be mapped and the concentric point of the quantized color group containing the color, and according to the distances between the color and the concentric point of the adjacent quantized color groups.

Figure 8:
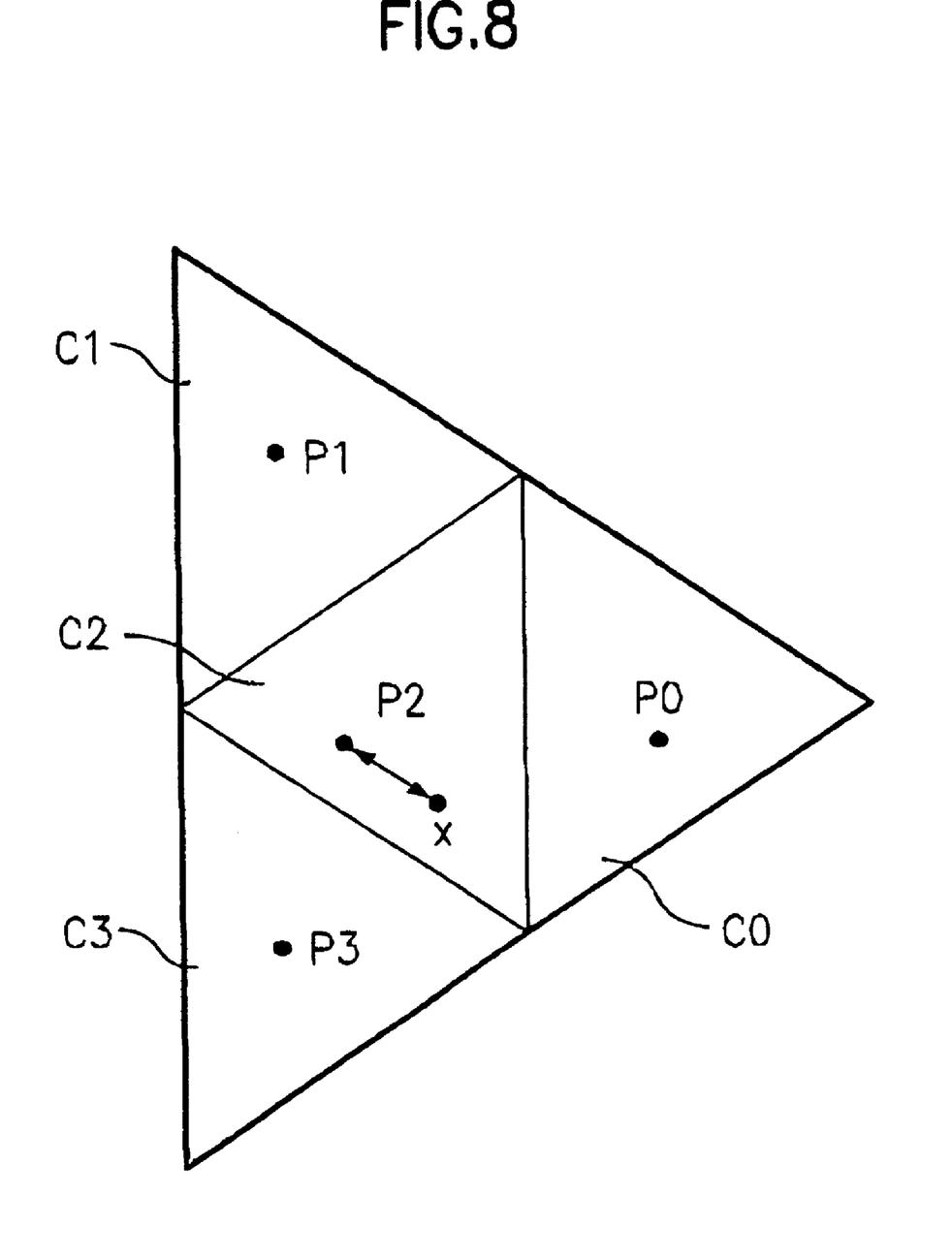
FIG. 8 illustrates a second embodiment of a color quantizing method using color spreading according to the present invention.

FIG. 8 illustrates a second embodiment of a color quantizing method using color spreading according to the present invention. First concentric points P0, P1, P2, and P3 are determined in each quantized color groups C0, C1, C2 and C3. The quantized space shown in FIG. 8 represents a 2-dimensional view of the quantized color spaces for one value of hue. However, each quantized color space would a 3-dimensional space according to the quantization of the hue. The concentric point is defined here as the center mass point of the 3-dimensional space.

To quantize a color on point x, the distance between point x and the concentric point of the quantized color group containing the color, and the distances between the color and the concentric points of the adjacent quantized color groups are calculated. Referring to FIG. 8, the calculated distances may be expressed as follows:

d2=distance (x, P2),
d0=distance (x, P0),
d1=distance (x, P1),
d3=distance (x, P3), where d2 is the distance between point x and the concentric point of the quantized color group C2 containing the x; d0, d1, and d3 are the distances between point x and the concentric points of the adjacent quantized color groups C0, C1, and C3.

For quantization using the HMMD space, the concentric points would be based upon the hue, the max value and min value as expressed below:

P0=$\{h_0, max_0, min_0\}$,
P1=$\{h_1, max_1, min_1\}$,
P2=$\{h_2, max_2, min_2\}$, and
P3=$\{h_3, max_3, min_3\}$.

Accordingly, when quantizing a color on point x, the weights are allocated to the indices of the quantized color groups according to the following equations:

weight to C0=1−d0/(d0+d1+d2+d3),
weight to C1=1−d1/(d0+d1+d2+d3),
weight to C2=1−d2/(d0+d1+d2+d3),
weight to C3=1−d3/(d0+d1+d2+d3).

Upon calculation of the weight values, a color quantization can be accomplished reflecting the real colors sensed by the human eye by giving the partial (weight) value to the neighboring color group in proportion to the distance from the concentric points using the color spreading.

As discussed above, the HMMD model and the color quantizing method using the HMMD color space and the color spreading has various effects. First, all the colors existing on the new HMMD color space is uniformly distributed and therefor, the color information corresponds to the change of color sensed by the human eye. The present invention also simply divides the colors by straight lines on the new HMMD color space to perform the color quantization.

In addition, the max, min, diff and sum values defining the HMMD model are obtained from R, G and B through a simple calculation without a special transformation and therefor, the calculating time is very rapid. Accordingly, the present invention may be proper in a digital color analysis.

Moreover, the present invention can perform an accurate image searching and image analysis at a high speed, and as well as extract efficient color information in an image processing of a face cognition, a motion picture searching, an MPEG and a gesture cognition, etc., where an image analysis technology is applied.

Furthermore, the present invention regards colors adjacent to a given color in the color space as the neighboring colors to allot partial values in proportion to the distance to the neighboring colors, instead of performing an indexing only in a particular color, for compensating an index error due to the color quantization. Therefore, a color quantization reflecting the change of the color sensed by the human eye may be accomplished. Accordingly, the present invention can enhance a performance of the image searching system based on content.

Finally, the present invention controls the quantization by adjusting a threshold used as a standard value in allotting the partial values, thereby being capable of performing the color quantization in various kinds of color spaces.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A HMMD color model having a shape which includes two symmetrical cones merged at flat surfaces, said merged cones including an axis disposed between an apex A and an apex B, comprising:
   a hue defined as an angle around the AB axis;
   a diff defined as a vector normal to the AB axis in a direction from the AB axis to a circumference C of the cones;
   a max value defined as a vector in a direction from the apex B of a bottom one of the cones to the circumference C;
   a min value defined as a vector in a direction from the circumference C to the apex A of a top one of the cones; and
   a sum value defined as a vector in a positive direction of the AB axis,
   wherein each of the max value, the min value, the diff, and the sum value range between 0 and 1 and the hue ranges from 0 to 360, and
   wherein the HMMD color model is converted from an RGB color model with (r, g, b) color values in accordance with the following equations:
   max value=maximum value from input r, g, b values;
   min value=minimum value from the input r, g, b values;
   diff=max value−min value;
   sum=(max+min)/2; and
   hue=
      (g−b)/(max−min)*60, if (r=max∩(g−b)≧0)
      (g−b)/(max−min)*60+360, if (r=max∩(g−b)<0)
      (2.0+(b−r))/(max−min)*60, if (g=max)
      (4.0+(r−g))/(max−min)*60, if (g=max)
      0, if max=min.

2. A HMMD color model of claim 1, wherein the max value controls the color shade from black to white and a pure color, the min value controls the tint from black and a pure color to white, the diff value controls the tone from gray to a pure color, and the sum controls the brightness from a dark to a light color.

3. A HMMD color model of claim 1, further comprising:
   MMD planes normal to and passing through the AB axis, and having a triangular boundary defined by the apex A, the apex B and circumference C, wherein each MMD plane contains the max, the min, the diff and the sum.

4. A method for content based image searching system, comprising:
   inputting images;
   extracting RGB color values of each pixel of the images;
   converting the RGB color values into values of an HMMD color space of an HMMD color model as defined in claim 1;
   mapping the converted RGB color values to corresponding colors by quantizing the HMMD color space;
   building a global color histogram for each input image;
   comparing the global color histograms to a reference global histogram of a target image; and
   selecting one of the input images having a global color histogram most similar to the reference color histogram.

5. A method of claim 4, further comprising the steps of:
   building a local color histogram for each input image;
   comparing the local color histograms to a reference local histogram; and
   selecting the input image with a global color histogram most similar to the reference global and with a local histogram most similar to the reference local histogram.

6. A method of claim 4, further comprising the step of arranging the input images by the order beginning from the image with a global histogram of the highest similarity, after similarity before selecting the input images.

7. A quantization method for an HMMD color space, comprising:
   (a) dividing a gray area of the HMMD color space;
   (b) color quantizing an MMD space;
   (c) color quantizing a hue area; and
   (d) mapping color information within each of the quantized areas to an identical value, wherein step (b) includes:
      dividing the MMD space by at least one line parallel to a center axis of the HMMD color space;
      dividing the MMD space by at least one line parallel to a max vector of the MMD space; and
      dividing the MMD space by at least one line parallel to a min vector of the MMD space, wherein the at least one line parallel to the center axis of the HMMD color space and the at least one line parallel to the max vector of the MMD space are reference lines separating different color groups, and wherein the dividing steps result in the MMD space being divided into a plurality of triangles.

8. A method of claim 7, wherein step (a) comprises the steps of:
   comparing a difference value of the HMMD color space to a predetermined reference value; and
   determining an area as the gray area if the diff is equal to or less than the reference value.

9. A method of claim 8, wherein the reference value depends on the hue.

10. A method of claim 8, wherein the gray area may be divided into a plurality areas depending on a sum and diff values of the HMMD color space.

11. A method of claim 7, wherein said plurality of triangles are right isosceles triangles.

12. A method of claim 7, wherein step (c) comprises the step of dividing the hue area equally into identical segments.

13. A method of claim 7, wherein step (c) comprises the step of dividing the hue area unequally giving the larger segments to the areas in which the RGB colors dominate.

14. A quantization method for an HMMD color space, comprising:
   (a) dividing a gray area of the HMMD color space;
   (b) color quantizing an MMD space;
   (c) color quantizing a hue area; and
   (d) mapping color information within each of the quantized areas to an identical value, wherein step (d) includes:
      determining concentric points of each of the quantized areas;
      determining a distance of a color position in a first quantized area from a concentric point of the first quantized area;
      determining a distance of the color position from a concentric point of a second adjacent quantized area;
      allocating weighted values to the first quantized area and to the second adjacent quantized area based upon the determined distances; and mapping the color position according to allocated weighted values, wherein in the step of allocating weighted values, the weights are allocated by the equation:

$$W_i = 1 - \frac{d_i}{\sum_{n=0}^{m} d_n}$$

where $W_i$ is the weight for the (i)th quantized area, $d_i$ is the distance of the color position in the (i)th quantized area from the concentric point of the (n)th quantized area, $d_n$ to $d_m$ are the distances of the color position from the concentric points of the quantized area or areas adjacent the first quantized area.

15. A quantization method for a color space having a plurality of color groups, comprising:

determining concentric points of each of said color groups;

determining a distance of a color position in a first color group from the concentric point of the first color group;

determining distances of the color position from the concentric points of the color group or groups adjacent the first color group;

allocating weighted values to the first color group and to the color group or groups adjacent the first color group based on the determined distances; and mapping the color according to the allocated weighted values, wherein in the step of allocating weighted values, the weights are allocated by the equation:

$$W_i = 1 - \frac{d_i}{\sum_{n=0}^{m} d_n}$$

where $W_i$ is the weight for the (i)th color group, $d_i$ is the distance of the color position in the (i)th color group from the concentric point of the (n)th quantized area, $d_n$ to $d_m$ are the distances of the color position from the concentric points of the color group or groups adjacent the first color group.

* * * * *

UNITED STATES PATENT AND TRADEMARK OFFICE
CERTIFICATE OF CORRECTION

PATENT NO.    : 6,633,407 B1
DATED         : October 14, 2003
INVENTOR(S)   : Hyeon Jun Kim and Jin Soo Lee

It is certified that error appears in the above-identified patent and that said Letters Patent is hereby corrected as shown below:

Column 9,
Line 33, please change "(4.0+(r-g))/(max-min)*60, if (g=max)" to
-- (4.0+(r-g))/(max-min)*60, if (b=max) --

Column 10,
Lines 7-8, please delete "after similarity"

Signed and Sealed this

Twenty-ninth Day of June, 2004

JON W. DUDAS
*Acting Director of the United States Patent and Trademark Office*